(12) United States Patent
Wright et al.

(10) Patent No.: US 6,196,062 B1
(45) Date of Patent: Mar. 6, 2001

(54) TRAILING EDGE ACOUSTIC EMISSION SENSOR AND PYROELECTRIC SENSOR FOR ASPERITY DETECTION

(75) Inventors: John Stuart Wright, Bloomington; Mark James Schaenzer, Eagan, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/575,318

(22) Filed: May 19, 2000

Related U.S. Application Data

(60) Provisional application No. 60/135,007, filed on May 20, 1999.

(51) Int. Cl.[7] .................................................. G01B 5/28
(52) U.S. Cl. ............................................. 73/105; 324/210
(58) Field of Search .................. 73/105, 104; 29/603.01, 29/603.07, 603.13, 603.14, 603.09; 360/113; 324/210, 211, 212, 216; 374/4

(56) References Cited

U.S. PATENT DOCUMENTS

| | | | |
|---|---|---|---|
| 5,233,482 | 8/1993 | Galbraith et al. ...................... 360/46 |
| 5,423,207 | * 6/1995 | Flechsig et al. ....................... 73/104 |
| 5,450,747 | * 9/1995 | Flechsig et al. ....................... 73/105 |
| 5,581,021 | * 12/1996 | Flechsig et al. ....................... 73/105 |
| 5,808,184 | 9/1998 | Boutaghou et al. ................... 73/105 |
| 5,817,931 | * 10/1998 | Boutaghou ............................. 73/105 |
| 5,822,139 | 10/1998 | Ayabe .................................... 360/31 |
| 5,825,181 | 10/1998 | Schaenzer et al. ................... 324/212 |
| 5,872,311 | 2/1999 | Schaenzer et al. .................... 73/105 |
| 5,915,271 | * 6/1999 | Berg et al. ............................. 73/105 |
| 5,942,680 | 8/1999 | Boutaghou ............................. 73/105 |
| 6,071,007 | * 6/2000 | Schaenzer et al. ..................... 374/7 |

\* cited by examiner

Primary Examiner—Richard A. Moller
(74) Attorney, Agent, or Firm—Schwegman, Lundberg, Woessner & Kluth, P.A.

(57) ABSTRACT

A disc testing system includes a base, a disc rotatably attached to the base, and an actuator assembly movably attached to the base. A ramp assembly includes a set of ramps for loading and unloading the sliders and transducing elements carried by the sliders to and from the disc attached to the base. A load spring is attached to the arm of the actuator. A slider is attached to the load spring. The slider further includes a leading edge and a trailing edge. A piezoelectric sensor and a pyroelectric sensor is carried by the trailing edge of the slider. The piezoelectric sensor and the pyroelectric sensor are made from the same material which has both piezoelectric properties and pyroelectric properties. The piezoelectric sensor and the pyroelectric sensor are formed by the same process. The two sensors can also be formed substantially simultaneously. A conductive layer is placed on the trailing edge of the slider followed by a strip of thick film material. Epoxy may be added to the sensors to form a composite of epoxy and lead titanate zirconate.

20 Claims, 8 Drawing Sheets

TRAILING EDGE ACOUSTIC EMISSION SENSOR AND PYROELECTRIC SENSOR FOR ASPERITY DETECTION

RELATED APPLICATION

This application claims the benefit of U.S. Provisional Application Ser. No. 60/135,007, filed May 20, 1999 under 35 USC 119(e).

FIELD OF THE INVENTION

The present invention relates to the field of mass storage devices. More particularly, this invention relates to a slider for use in a disc drive which includes an acoustic emission and pyroelectric sensor for detecting thermal asperities.

BACKGROUND OF THE INVENTION

Computer systems have many different places where data can be stored. One common place for storing massive amounts of data in a computer system is on a disc drive. The most basic parts of a disc drive are a disc that is rotated, an actuator that moves a transducer to various locations over the disk, and electrical circuitry that is used to write and read data to and from the disk. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disk.

The transducer is typically housed within a small ceramic block. The small ceramic block is passed over the disc in a transducing relationship with the disk. The transducer can be used to read information representing data from the disc or write information representing data to the disk. When the disc is operating, the disc is usually spinning at relatively high RPM. These days common rotational speeds are 7200 RPM. Some rotational speeds are as high as 10,000 RPM. Higher rotational speeds are contemplated for the future. These high rotational speeds place the small ceramic block in high air speeds. The small ceramic block, also referred to as a slider, is usually aerodynamically designed so that it flies over the disk. The best performance of the disc drive results when the ceramic block is flown as closely to the surface of the disc as possible. Today's small ceramic block or slider is designed to fly on a very thin layer of gas or air. In operation, the distance between the small ceramic block and the disc is very small. Currently "fly" heights are about 0.5–1.0 microinches. In some disc drives, the ceramic block does not fly on a cushion of air but rather passes through a layer of lubricant on the disk.

Information representative of data is stored on the surface of the memory disk. Disc drive systems read and write information stored on tracks on memory disks. Transducers, in the form of read/write heads, located on both sides of the memory disk, read and write information on the memory disks when the transducers are accurately positioned over one of the designated tracks on the surface of the memory disk. The transducer is also said to be moved to a target track. As the memory disc spins and the read/write head is accurately positioned above a target track, the read/write head can store data onto a track by writing information representative of data onto the memory disk. Similarly, reading data on a memory disc is accomplished by positioning the read/write head above a target track and reading the stored material on the memory disk. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of a disc drive. Servo feedback information is used to accurately locate the transducer. The actuator assembly is moved to the required position and held very accurately during a read or write operation using the servo information.

Disc drives have actuator assemblies which are used to position the slider and transducer at desired positions with respect to the disk. The slider is attached to the arm of the actuator assembly. A cantilevered spring, known as a load spring, is typically attached to the actuator arm of a disc drive. The slider is attached to the other end of the load spring. A flexure is attached to the load spring and to the slider. The flexure allows the slider to pitch and roll so that the slider can accommodate various differences in tolerance and remain in close proximity to the disk. The slider has an air bearing surface ("ABS") which includes rails and a cavity between the rails. The air bearing surface is that portion of the slider that is nearest the disc as the disc drive is operating. When the disc rotates, air is dragged between the rails and the disc surface causing pressure, which forces the head away from the disk. At the same time, the air rushing past the depression in the air bearing surface produces a negative pressure area at the depression. The negative pressure or suction counteracts the pressure produced at the rails. The different forces produced counteract and ultimately fly over the surface of the disc at a particular fly height. The fly height is the thickness of the air lubrication film or the distance between the disc surface and the head. This film eliminates the friction and resulting wear that would occur if the transducing head and disc were in mechanical contact during disc rotation.

Disc surfaces have asperities or bumps which interfere with the flying characteristics of the data transducer head. The asperities can also interfere with the read and write operations of the data head. In operation, the data transducer head can come into contact with asperities while the head flies above the surface of the disc. Potentially, this undesirable contact can cause data written to a particular location on a disc to be lost. Large asperities may cause a catastrophic head crash. Other smaller asperities may cause a shift in the signal read back from a transducer head. The shift needs to be corrected or pulled down so that the signal representing information stored to the disc can be read back without error.

In an ideal world, the surfaces of the disc would be flat so that a transducing head could fly over the surface without having to encounter any asperities. In the real world asperities exist on the disc surfaces so the disc surfaces are typically tested initially to determine if the disc should be rejected. In other words, if the disc is not smooth enough so that a fly height can be maintained, the disc is rejected. If the disc is substantially smooth or flat, the disc will still generally have some asperities. The asperities on a disc are located using a defect scanning process.

Disc asperities which are located in the factory during a defect scanning process can be recorded in a disc drive's primary defect list so that the drive does not store data at those locations. Known asperity detection techniques use sensors (such as MR sensors or piezoelectric sensors). Such known asperity detection techniques rely both on the flying characteristics of the heads and upon the thermal response from friction induced head/asperity contact. If one sensor is used without the other, there is a possibility that all types of asperities may not be found. The energy of the impact or amplitude detected by an MR or other sensor is calibrated to determine the asperity characteristics such as height of the asperity. By calibrating the slope and duration of the resistance change waveform to a range of asperity heights and characteristics, the height of a particular asperity can be determined by detecting the momentary change in resistance of the sensor after contact.

However, the voltage signals corresponding to the impact of a sensor element with an asperity include components of noise, air bearing excitation, and other vibrations or excitations which may detract from the accuracy of calibrating the height of an asperity based upon the voltage signal from an MR sensor element or a piezoelectric sensor element after contact with the asperity.

Additionally, such devices require that the disc surface be scanned at various fly heights of the head so that various sizes of asperities can be detected to map the entire range of defects. As the speed of rotation of the disc is changed, the response of the specially-designed heads also changes. For example, if the speed is reduced, the energy of impact is reduced, thus making it more difficult to calibrate the defect size and height.

In order to certify that a magnetic disc is adequately smooth for use in a disc drive system, testing is performed on the disc. One type of testing is performed by utilizing a test slider having a piezoelectric element bonded thereon. When any part of the slider contacts a protrusion on the surface of the disc, the slider will vibrate from the impact. Generally, the piezoelectric element is useful in finding larger asperities such as a blister on a disc. The piezoelectric element bonded on the slider senses these vibration forces acting on the slider, exhibiting a voltage between its terminals representative of the forces experienced by the element. If the vibration force sensed by the piezoelectric element exceeds a predetermined design level, or if vibration occurrences exceed a predetermined design frequency, then the disc media under test is not adequately smooth to be used in applications.

There are several problems involved with utilizing piezoelectric test sliders to test the smoothness of a disc. By bonding the piezoelectric element to the slider, the piezoelectric element loses some of its sensitivity to forces acting on the slider, since some of these forces may be absorbed through the bond to the piezoelectric element. Piezoelectric test sliders are therefore relatively insensitive to narrow defects and asperities in the disc being tested. In addition, the process of bonding a piezoelectric element to the slider affects the aerodynamic characteristics of the slider, which are desirably tightly controlled. Finally, the process of assembling a piezoelectric element on a slider is a tedious and expensive undertaking, and is not standard since piezoelectric elements are not employed on actual read/write heads. Changes in the process of manufacturing the slider must be made, which makes manufacturing test sliders less efficient.

Another type of testing is performed by equipping a test slider with thermal asperity sensor, such as a MR transducer. A thermal change occurs in the sensor upon detecting a defect or asperity in the disc at the transducer, which changes the resistance of the MR element and thereby indicates the presence of a defect on the disc. The defect or asperity may be a depression or a rise (bump) in the disc surface, as each affects the resistance characteristics of the MR element oppositely. However, if the transducer (which is positioned on a rail at the trailing edge of the slider) does not directly confront the defect on the disc, the MR sensor is unable to detect the presence of the defect. Thus, for wide defects, the slider may "bounce" over the defect after contacting it near the leading edge of the slider, the force of which would affect the height of the thermal asperity sensor over the surface of the disc and thereby cause errors in detecting the defect.

One solution to the problems presented in testing the smoothness of a disc has been to perform two separate glide tests, one with a piezoelectric test slider and one with a separate thermal asperity test slider. The piezoelectric slider is used for best performance in detecting "short and fat" defects on the disc, while the thermal asperity slider is used for best performance in detecting "tall and thin" defects in the disc.

However, additional problems are presented by using separate piezoelectric test sliders and thermal asperity test sliders. Greater time and effort is involved in performing two separate tests. Also, the potential for inaccuracies in measurements is present, since the piezoelectric test slider may not have identical flying characteristics as the MR test slider.

Current solutions may include placing both a piezoelectric and MR sensor on the slider so that two tests may be performed at once. However, the manufacturing time for producing such a glide slider is long. In addition, the process for making such sliders is generally complex. The resulting slider is less than reliable since there are more potential areas for failure. Still another problem is that an acoustic emission sensor is typically placed along the rails. As is well known, impact of media asperities with slider rails during disc operation also results in mechanical vibrations in the slider body, which may be detected by an acoustic emission sensor (AES). The vibrations that are easiest to detect are the fundamental resonance modes, due to the magnitude of their vibration. In a paper by K. O'Brien and D. Harris, Head/Disk Interface Contact Detection using a Refined Acoustic Resonance Technique, presented at Joint SAME/STLE Tribology Conf., Oc. 8-11, 1995, the first three resonance modes in a 50 s slider were determined to be 687.7, 902.4, and 1381 kHz. In the first two modes, the largest deformation occurs along the slider edge in the direction of the rails, while in the third mode the largest deformation is along the trailing and leading edges.

As a result, the third mode vibrations are not easily detected with acoustic emission sensors positioned in or near the rails of the slider.

There is a need in the art for an integrated thermal asperity and piezoelectric sensing device to allow testing of disc smoothness with a single test slider that is simply designed and provides reliable measurements. There is also a need for integrated thermal asperity and piezoelectric sensor device that can be easily manufactured. There is also a need for an integrated thermal asperity and piezoelectric sensing device that will more accurately sense the various asperities on a disc. There is still a further need for an integrated thermal asperity and piezoelectric sensing device that is more sensitive to the third mode of resonance of a slider.

SUMMARY OF THE INVENTION

A device for testing smoothness of a rotatable disc includes a slider for conducting a glide test over the surface of the disc. The slider further includes a leading edge and a trailing edge. A piezoelectric sensor carried by the trailing edge of the slider. The piezoelectric sensor is responsive to vibrations of the slider caused by contact with asperities on the disc. A pyroelectric sensor is also carried by the trailing edge of the slider. The pyroelectric sensor is responsive to thermal changes of the slider caused by contact with asperities on the disc. The piezoelectric sensor and the pyroelectric sensor are made from the same material. The material having both piezoelectric properties and pyroelectric properties. In one embodiment, the piezoelectric sensor and the pyroelectric sensor include lead titanate zirconate. The piezoelectric sensor and the pyroelectric sensor are formed by the same process. The piezoelectric sensor includes a strip of thick film material placed across the trailing edge of the slider. The piezoelectric sensor includes lead zirconate titanate. The piezoelectric sensor also may be a composite of epoxy and lead titanate zirconate. The pyroelectric sensor also includes a strip of thick film material placed across the trailing edge of the slider. The pyroelectric sensor includes lead zirconate titanate and may include epoxy to form a composite of epoxy and lead zirconate titanate. In one embodiment, both the piezoelectric sensor and the pyroelectric sensor include a conductive layer with a thick film layer placed atop the conductive layer, said thick film layer including a material having both pyroelectric and piezoelectric properties. The piezoelectric sensor is a first strip and the pyroelectric sensor is a second strip. Both the first and second strip traverse the trailing edge of the slider.

Also disclosed is a method of constructing a device for testing smoothness of a rotatable disc. The method includes forming a slider having an air-bearing surface, a leading edge and a trailing edge, and forming a first conductive strip in a first layer on the trailing edge of the slider. In addition, a second layer is formed including a material having piezoelectric and pyroelectric properties on the first layer. A second conductive strip may be formed near the first conductive strip in the first layer on the trailing edge of the slider. In addition, a second layer including a material having piezoelectric and pyroelectric properties is placed on the second conductive strip in the first layer. The first layer, including the first conductive strip and the second conductive strip, may be formed substantially simultaneously. The second layer may also be formed substantially simultaneously. The second layer may be formed using screen printing.

Advantageously, mounting a piezoelectric/pyroelectric sensor at the trailing edge increases the sensitivity of detecting asperity/slider impacts (mode 3 described above). This increase in sensitivity is achieved in two ways. The first is moving the sensor to the portion of the slider that experiences the largest deformation, resulting in a larger deformation in the sensor and thus an increase in sensitivity. The second is the elimination of the compliant epoxy layer, currently used to attach PZT to the HGA or to the slider. Epoxy can absorb strain energy, resulting in a decrease in the sensor deformation and sensitivity. A further advantage is that the piezoelectric and pyroelectric strip are easily manufactured since both can be made substantially simultaneously on a wafer and then diced to form individual sliders. The sensors also form an integrated thermal asperity and piezoelectric sensing device that allows testing of disc smoothness with a single test slider. The sensors are simply designed and provide reliable, accurate measurements. The sensors also more accurately sense the various asperities on a disc and, more particularly, the integrated thermal asperity and piezoelectric sensing device that results is more sensitive to the third mode of resonance of a slider.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
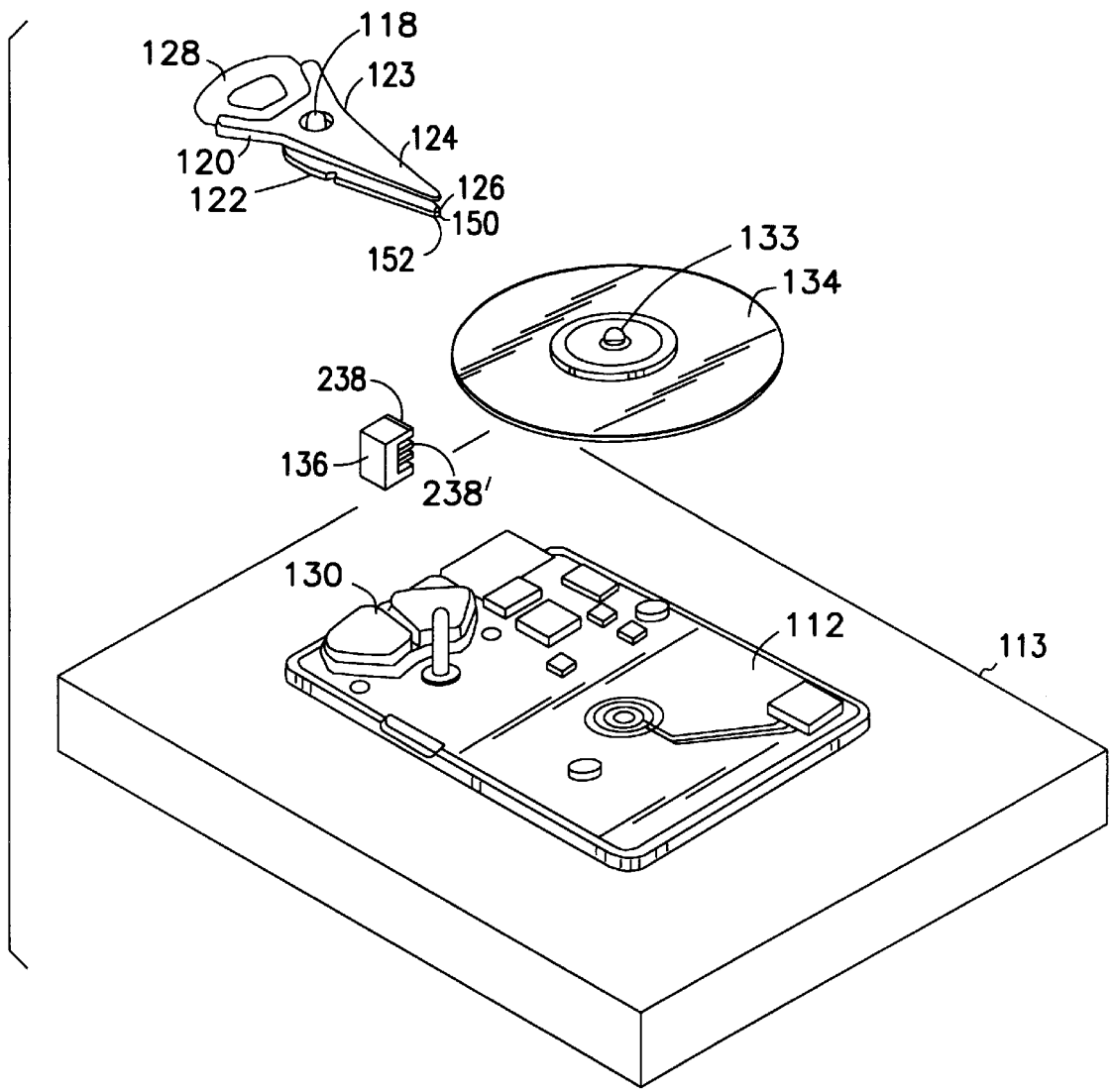
FIG. 1 is an exploded view of a disc test stand with a disc placed thereon.

FIG. 1 is an exploded view of one type of a disc tester 100 having a rotary actuator. The disc tester 100 includes a base 112. The base 112 may include a granite or other stable platform 113. Rotatably attached to the base 112 on an actuator shaft 118 is an actuator assembly 120. The actuator assembly 120 includes an elongated structure 122 having an arm 123. Attached to the arm 123, is a load beam or load spring 124. The load beams or load spring is also referred to as a suspension. Attached at the end of each load spring 124 is a slider 126 which carries a magnetic transducer 150. The slider 126 with the transducer 150 form what is many times called the head. It should be noted that many sliders for disc testers have more than one transducer 150. Also attached to the load spring is a load tang 152. The load tang 152 is used for loading the slider 126 to the disc 134 placed on the spindle and unloading the slider 126 from the disk under test. On the end of the actuator arm assembly 120 opposite the load spring 124 and the slider 126 is a voice coil 128.

Attached to the base 112 is a pair of magnets 130 and 131. The pair of magnets 130 and 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In FIG. 1, a disc 134 under test is temporarily attached to the spindle hub 133.

Figure 2:
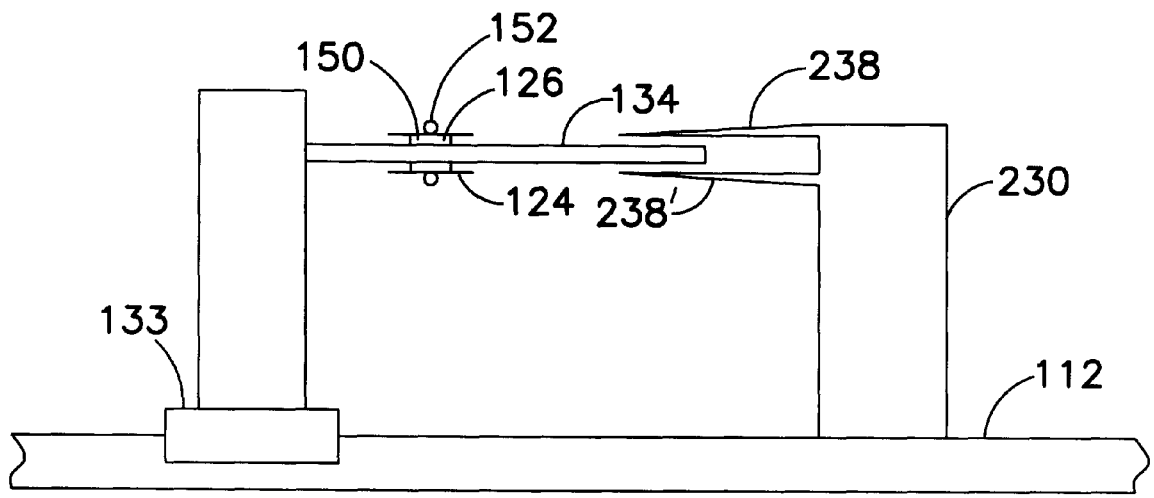
FIG. 2 is a side view of a disc tester showing a ramp structure.

Also attached to the base 112 is a ramp structure 136. FIG. 2 is a side view of a disc drive having a ramp structure. Now looking at FIG. 2, the ramp structure will be described in more detail. The ramp structure 136 has a plurality of individual ramps 238 and 238'. One ramp is associated with each surface of the disk. As shown, there is a ramp portion 238 for the top surface of a disc and a ramp 238' for a bottom surface of the disc 134. The ramp portion 238 is for the loading and unloading the transducer from the top surface of a disc 134 and the ramp portion 238' is for loading and unloading a transducer from the bottom surface of a disc 134. Each disc 134 has two surfaces so there are a total of two disc surfaces to test.

Also shown in FIG. 2 are the load springs 124, which are referred to by some as load beams or suspensions, and the attached load tangs 152. The load tangs 152 are attached to the load springs 124. The slider 124 and transducer 150 carried by the slider are not illustrated in FIG. 2 for the sake of clarity. All the load springs 124 and tangs 152 are attached to the actuator. Moving the actuator assembly 120 moves all the load springs 124 and load tangs 152. In operation, the actuator assembly 120 is moved to a park position when the disc drive is powered down or when the test is concluded. Moving the actuator to the park position causes the load tangs 152 associated with each load spring 124 to ride up the ramp 238 or 238' associated with the surface of the disc 134. This is referred to as unloading the disk. When the disc drive is powered on, the actuator moves to an operating position by moving the load springs 124, load tangs 152, sliders and transducers off their respective ramps 238 or 238' into a transducing position over the surface of the disc 134. This is referred to as loading the disk. The load springs 124, load tangs 152 sliders 124 and transducers 150 of the disc drive are shown in a transducing position in FIG. 2. It should be noted that much of the actuator assembly 120 has been eliminated from FIG. 2 for the sake of clarity.

Figure 3:
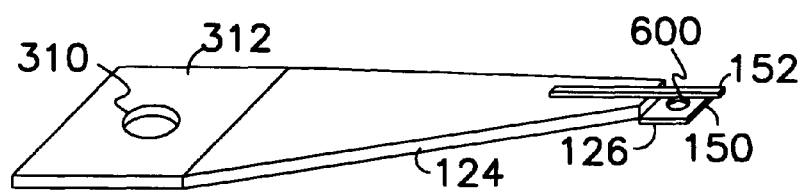
FIG. 3 is a perspective view of a load beam and load tang.

FIG. 3 is a perspective view of a load spring 124 and tang 152. The load spring 124 is a triangular structure which acts as a cantilevered spring to place a small load onto the slider 126 when the slider 126 is in transducing relationship with the disc 134. The load spring 124 is attached at its wider end to an actuator arm 123. The load spring 124 shown in FIG. 3 has a swage opening 310 and a swage plate 312 in the wider end. The swage opening 310 and swage plate 312 are used to attach the load spring 124 by a process referred to as swaging. Other attachment methods may also be used without departing from the spirit of this invention. The tang 152 is attached to a free end 320 of the load spring 124. The tang 152 is shown as an elongated cylinder. Also attached to the load spring 124 is the slider 126. The transducer 150 is carried by or within the slider 126. The tang 152 includes a gimbal dimple 600.

Figure 4:
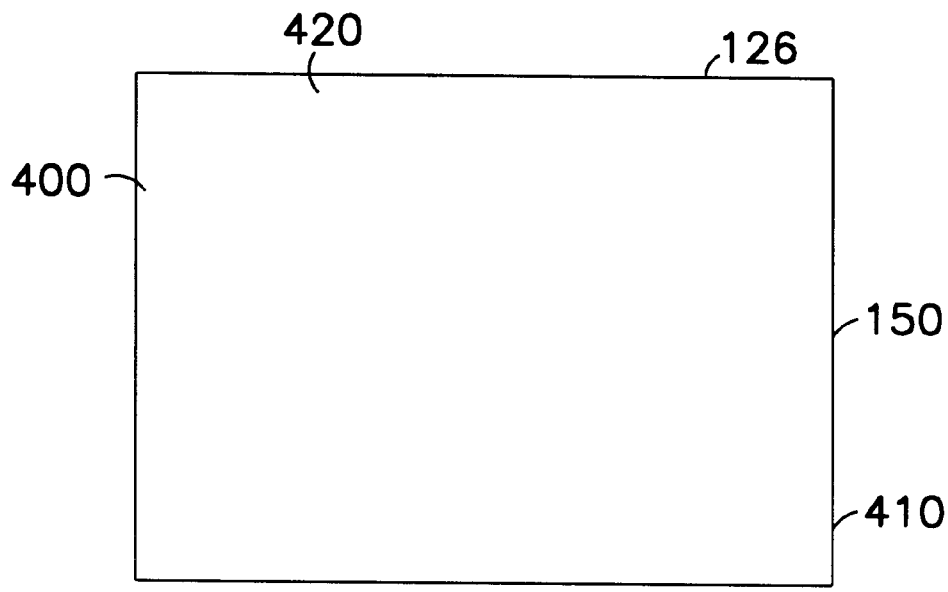
FIG. 4 is a top view of the slider.

FIG. 4 is a top view of the slider 126. The slider 126 includes a leading edge 400 and a trailing edge 410. When the slider 126 is in transducing relation with the disc (not shown in FIG. 4), the slider 126 flies or passes over the disc with the leading edge 400 facing forward. The slider 126 also includes a gimbaling surface 420. The gimbaling surface 420 is the surface that the gimbal dimple 600 contacts while the slider 126 is in transducing relation with respect to the disk. It should be noted that the gimbal surface 420 is sometimes referred to as the back side of the slider. Thus, the gimbal surface 420 can also be referred to as the back side surface of the slider 126.

Figure 5:
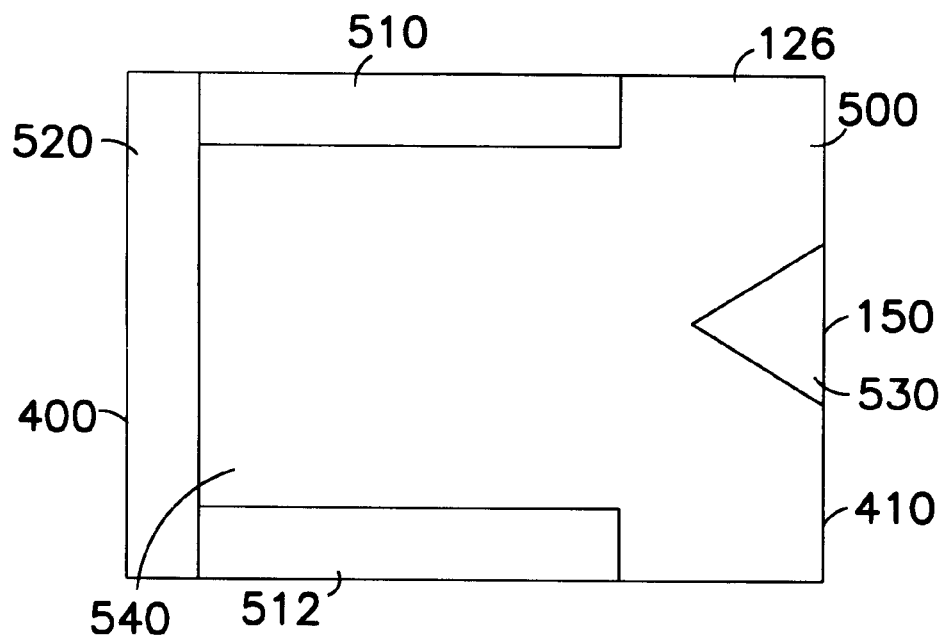
FIG. 5 is a bottom view of the slider which shows the air bearing surface.

FIG. 5 is a bottom view of the slider 126 which shows an air-bearing surface 500. The air-bearing surface 500 is the portion of the slider 126 which is nearest to the disc 134 (shown in FIG. 6). The air-bearing surface 500 includes a first side rail 510 and a second side rail 512 which are located near the sides of the slider 126. The air-bearing surface 500 also includes a leading tapered step 520 which is positioned near the leading edge 400 of the slider 126. The air-bearing surface 500 also includes a center pad 530 which is positioned near the trailing edge 410 of the slider 126. Between the side rail 510 and the side rail 512 and the leading tapered step 520, is a cavity or slightly depressed area 540. When the disc 134 is rushing past the air-bearing surface 500 of the slider 126, there are high pressure areas and low pressure areas formed at the air-bearing surface 500. The high pressure areas include the leading tapered step 520, the first side rail 510 and the second side rail 512. Another high pressure area is the center pad 530. Air rushing past the cavity 540 produces a negative pressure or suction force. As a result, the pressure in the cavity 540 area is low and, therefore, the cavity is referred to as the low pressure area of the air-bearing surface 500. A high suction slider 126 is one that produces a relatively high negative pressure area 540. High suction bearings, as mentioned previously, are very desirable since there is less variance in fly height when using a high suction bearing and since the fly height profile is relatively flat despite the fact that the slider 126 is positioned at various radial positions from the center of the disc 134. In addition, the high suction air-bearing sliders 126 have less altitude sensitivity.

Figure 6:
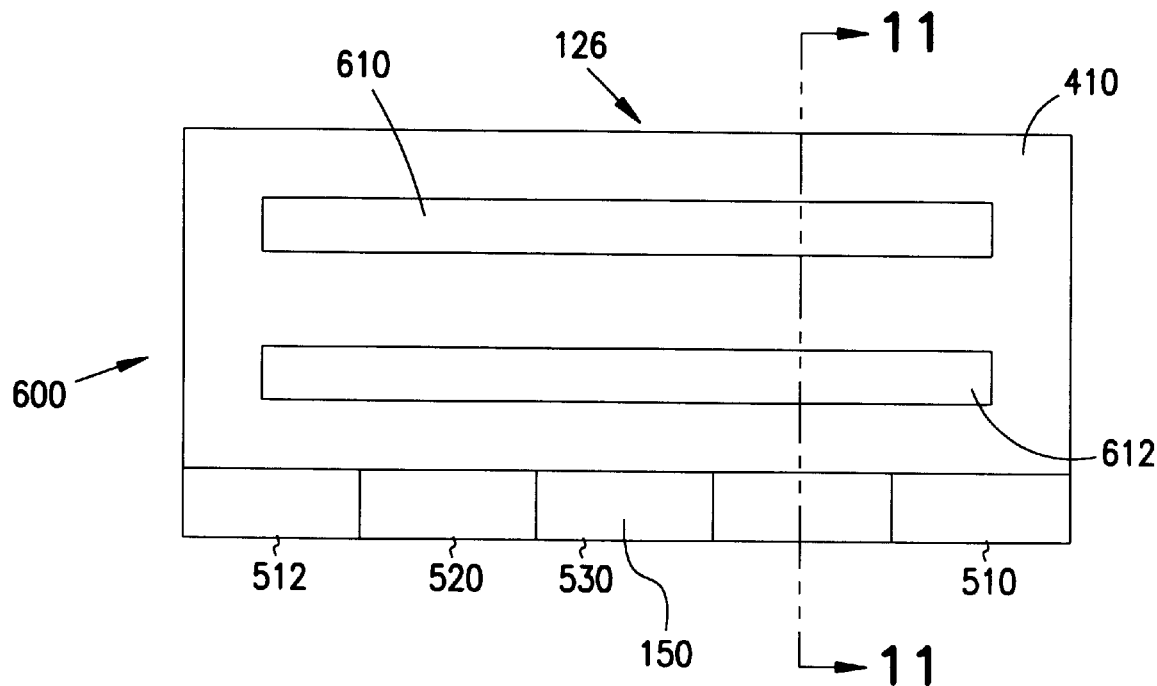
FIG. 6 is an end view of the slider showing the trailing edge.
Figure 7:
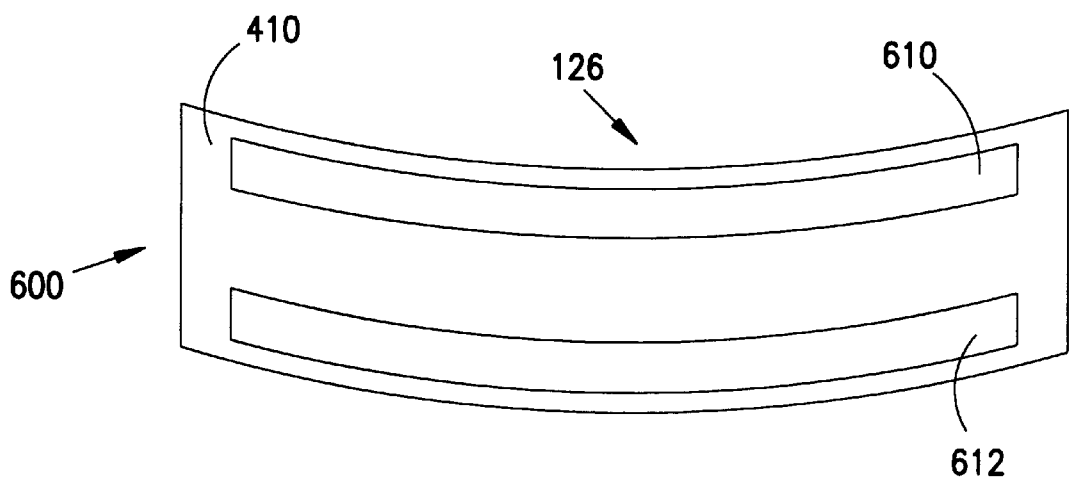
FIG. 7 is a schematic end view of the slider without rails exhibiting mode-3 deformation.

FIGS. 6 and 7 show end views of a slider 126. Both end views show the trailing edge 410. The end view shown in FIG. 6 includes the first side rail 510, the second side rail 512, the center pad 530 which includes the transducer 150 and the leading edge 520. The end view shown in FIG. 6 shows the slider 126 in an undeformed state. The end view of the trailing edge 410 of the slider 126 shown in FIG. 7 is shown in mode-3 deformation. The deformation is exaggerated in FIG. 7. FIG. 7 also has many of the elements shown in FIG. 6 removed for the sake of clarity of showing the invention. In both FIGS. 6 and 7, a combination acoustic emission sensor and pyroelectric sensor 600 has been attached to the trailing edge 410 of the slider 126. The combination acoustic emission sensor and pyroelectric sensor 600 includes a first strip 610 and a second strip 612 of a material that exhibits both piezoelectric and pyroelectric properties. Lead, titanate, zirconate which is $Pb(Zr_xTi_{1-415x})O_3 x=0.52$ ("PZT") is a material that is currently used to make acoustic emission sensors.

In addition to piezoelectricity, PZT exhibits pyroelectricity, a change in polarization with respect to a change in temperature. PZT is used to detect thermal asperities in magnetic recording media as well as acoustic emissions or vibrations. To allow for more sensitive asperity mapping, a PZT sensor 600 is mounted closer to the asperity/slider impact site. By placing the piezoelectric and pyroelectric sensor 600 at the trailing edge 410, the sensor is positioned where the slider makes contact with the media so that a more sensitive asperity and thermal asperity sensor is realized.

The sensor strips 610, 612 are also placed across the trailing edge 410 of the slider 126 so that the sensor 600 is more sensitive to mode 3 vibrations of the slider 126. The strips 610, 612 are formed with PZT material in the embodiment shown and described. It should be noted that strips 610, 612 could be made of any material which exhibits both piezoelectric and pyroelectric effects.

One advantage of the invention is that both sensor strips 610, 612 can be placed on the trailing edge at the wafer level. The process requires a heating step which would break down a slider 126 made of $Al_2O_3/TiC$, so the slider is made of $SiO_2$.

Figure 8:
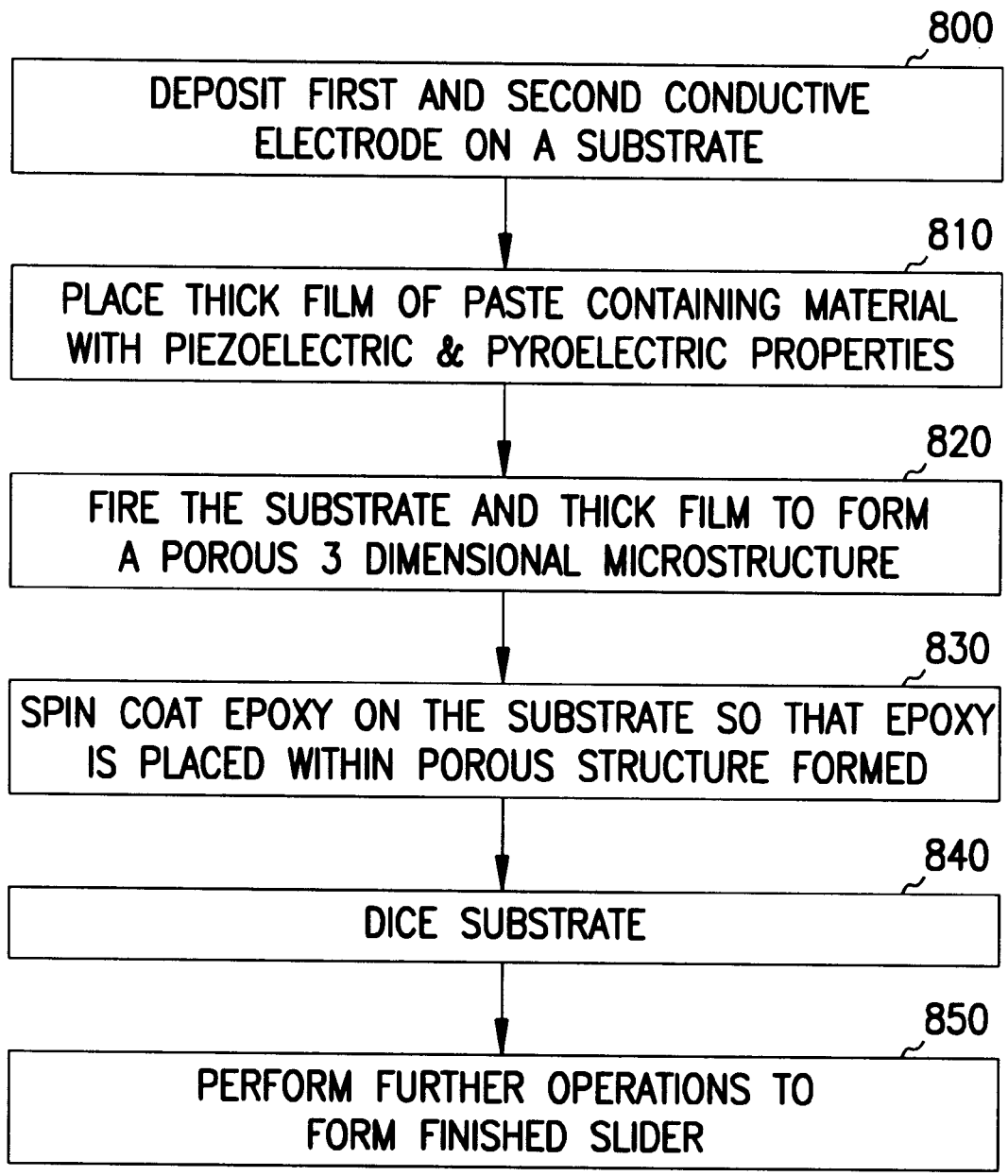
FIG. 8 is a flow diagram of the method for making the invention slide.

The PZT is deposited directly onto a wafer using screen printing. This process will now be detailed with respect to FIG. 8. To prepare the piezoelectric sensor 612 and pyroelectric sensor 610, a conductive electrode 1100, 1102 (Ag, Ag/Pd, Pd, Pt, Au, etc.) would first be printed onto a passivated Si wafer ($SiO_2$, dielectric layer, etc.) of the proper size (step 800). Current sliders are 50 series size (4.5"×4.5"× 0.080"). The PZT would then be screen printed (step 810) to the desired thickness in such a manner that upon firing (step 820), a porous three-dimensionally interconnected microstructure would result. Screen printing, also referred to as thick film deposition, involves deposition of a paste through either a patterned screen or stencil (patterned stainless steel). The paste contains organic (polymer, solvent, stabilizers, etc.) and inorganic (metal, ceramic, etc.) components. In the case of screen printing, the desired pattern is formed in a photo-sensitive emulsion deposited onto a screen mesh. A screen printable paste containing PZT is forced through the screen with a squeegee, and is deposited on the substrate. Pastes that have been obtained, available as X-038, from Ferro Corp. of San Marcos, Calif., have resulted in the preparation of porous PZT thick films. For acoustic sensors, however, the preparation of a porous film is desirable. After the paste is patterned on the substrate, the substrate is heated to 1100° C. for approximately 12 hours to form the desired interconnect structure.

State-of-the-art screen printing is capable of producing 0.002" line widths with 0.0005" registration between successive layers. To print a piezoelectric sensor and pyroelectric sensor on the trailing edge, an alternative to the traditional slider material is necessary, due to the temperatures required in screen printing PZT. Flor slider material, $Al_2O_3$/TiC (AlTiC), temperatures about ~900° C. result in carbon and Ti oxidation. An alternative would be to make the slider out of Si, which is capable of withstanding ~1100° C., the temperature required for thick film PZT deposition.

An epoxy is then applied to the wafer by spin coating (step 830) to form a PZT/epoxy composite. PZT/epoxy composites have been shown to increase the sensitivity of acoustic sensors. Medical ultrasound transducers are based on 1–3 connectivity PZT/epoxy composites, discrete PZT posts connected in one dimension surrounded by epoxy connected in three dimensions. A 3—3 connectivity composite consists of two interpenetrating phases both connected in three dimensions. The piezoelectric coefficient of interest in acoustic sensors is the voltage coefficient, $g_{33}$, which describes the voltage generated across the composite in response to a stress (such as that caused by an incoming acoustic wave). The following formula defines the piezoelectric voltage coefficient:

$$g_{33} = \frac{d_{33}}{\varepsilon_{33}} \quad (1)$$

where $d_{33}$ is the strain or charge coefficient and $\varepsilon_{33}$ is the relative permittivity of the sensor. For dense PZT, the relative permittivity is an order of magnitude higher than a PZT/epoxy composite. Although both $d_{33}$ and $\varepsilon_{33}$ are reduced upon replacing PZT with an epoxy, for a given epoxy content the $\varepsilon_{33}$ coefficient is reduced more. This results in an overall increase in the sensitivity of the composite as compared to dense PZT.

Finally the substrate would be diced or cut into individual sliders (step 840) 126. Further fabrication would be done to form the finished slider (step 850) with rails 510, 512, a center pad 5230 and a leading edge 520.

Figure 9:
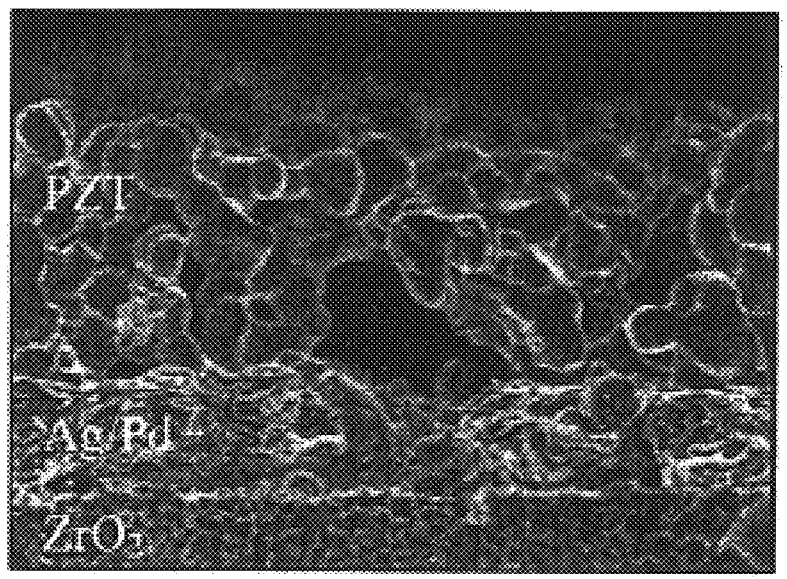
FIG. 9 is a SEM micrograph showing a cross section of a porous screen printed PZT.
Figure 10:
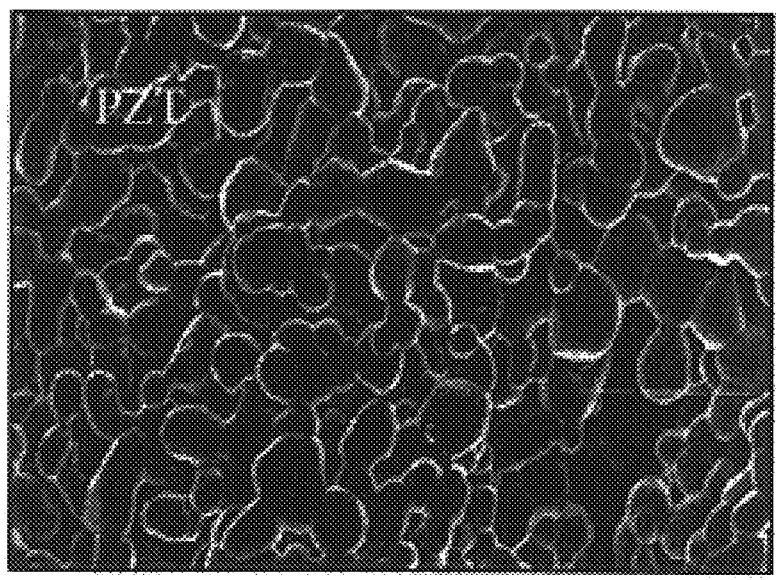
FIG. 10 is a SEM micrograph showing a plan view of a porous screen printed PZT.

The sensor strips 610, 612 would have the interconnected microstructure shown in cross section and plan view in FIGS. 9 and 10. FIGS. 9 and 10 show that grain boundaries have formed between the PZT particles, indicating partial sintering. These grain boundaries span all three dimensions of the film and provide structural integrity, which will allow thick film to deform in response to an acoustic signal. The porous film as deposited could not have a top electrode deposited, as the conductive material would short with the bottom electrode. An epoxy could be infiltrated using a spin coating method, so that both the epoxy and PZT would be exposed at the surface. In this manner, electrical connection could be made with the PZT. Additionally, the presence of the epoxy increases the sensitivity of the acoustic sensor, while attachment to the slider is made through a well-adhered metal film (bottom electrode). The top electrode would then be deposited by a suitable thin film deposition method (sputtering, evaporation, etc.) and could be patterned to increase the sensitivity. FIG. 7 shows a view of the expected shape of the trailing edge caused by mode 3 (1381 kHz). By patterning the electrode as shown, the top sensor would be wholly in compression, while the bottom electrode would be wholly in tension. The combination of the absolute value of the signal from patterned electrodes would result in a larger signal compared to a non-patterned top electrode, where the average state of stress (both compressive and tensile across the trailing edge face), may sum to close to zero.

Advantageously, mounting a piezoelectric/pyroelectric sensor at the trailing edge increases the sensitivity of detecting asperity/slider impacts (mode 3 described above). This increase in sensitivity is achieved in two ways. The first is moving the sensor to the portion of the slider that experiences the largest deformation, resulting in a larger deformation in the sensor and thus an increase in sensitivity. The second is the elimination of the compliant epoxy layer, currently used to attach PZT to the HGA or to the slider. Epoxy can absorb strain energy, resulting in a decrease in the sensor deformation and sensitivity. A further advantage is that the piezoelectric and pyroelectric strip are easily manufactured since both can be made substantially simultaneously on a wafer and then diced to form individual sliders. The sensors also form an integrated thermal asperity and piezoelectric sensing device that allows testing of disc smoothness with a single test slider. The sensors are simply designed and provide reliable, accurate measurements. The sensors also more accurately sense the various asperities on a disc and, more particularly, the integrated thermal asperity and piezoelectric sensing device that results is more sensitive to the third mode of resonance of a slider.

Figure 11:
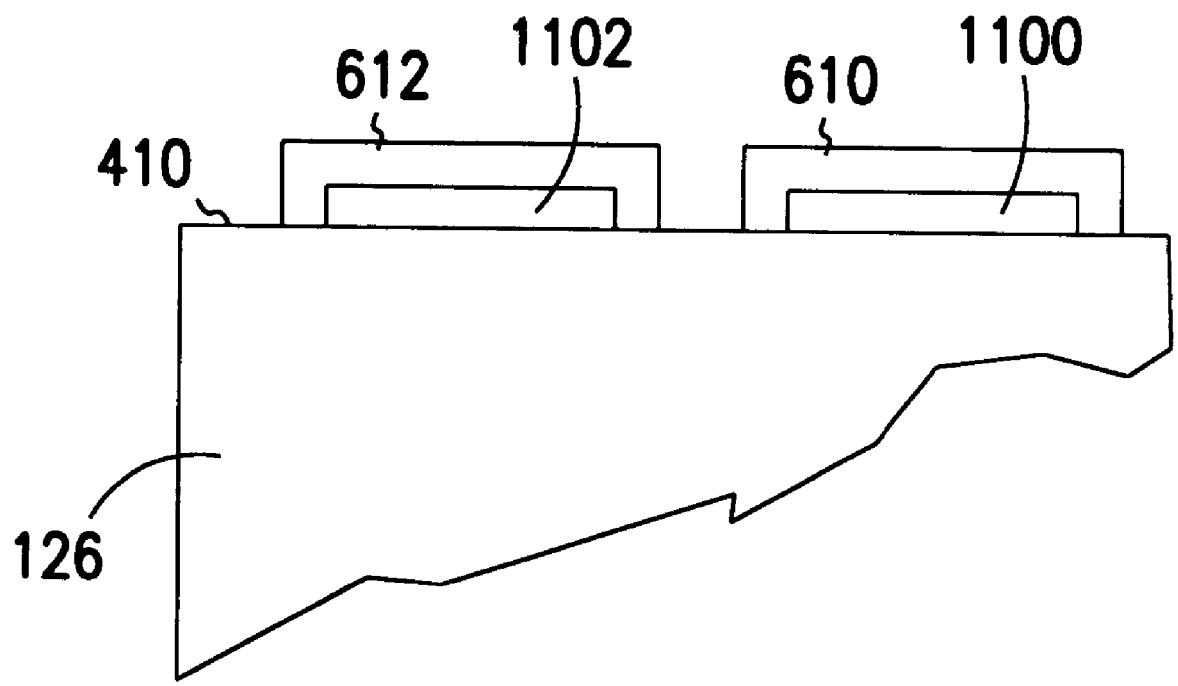
FIG. 11 shows a cross-sectional view of the slider at line 11—11 in FIG. 6.

FIG. 11 shows a cross-sectional view of the slider at line 11—11 in FIG. 6. As is shown in FIG. 11, a first conductive strip 1100 and a second conductive strip 1102 are formed on the trailing edge of the finished slider 126. The pyroelectric sensor 610 and the piezoelectric sensor 612 are formed over the first conductive strip 1100 and the second conductive strip 1102.

Figure 12:
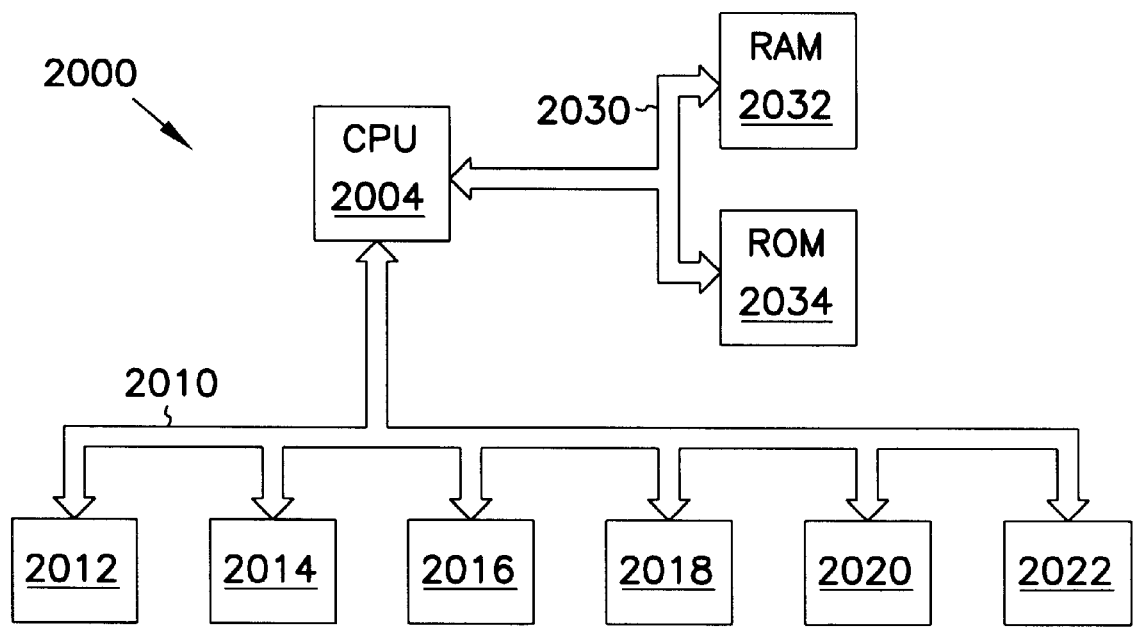
FIG. 12 is a schematic view of a computer system.

FIG. 12 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

CONCLUSION

In conclusion, a device for testing smoothness of a rotatable disc 100 includes a slider 126 for conducting a glide test over the surface of the disc 134. The slider 126 further includes a leading edge 400 and a trailing edge 410. A piezoelectric sensor 612 carried by the trailing edge 410 of the slider 126. The piezoelectric sensor 612 is responsive to vibrations of the slider 126 caused by contact with asperities on the disc 134. A pyroelectric sensor 610 is also carried by the trailing edge 410 of the slider 126. The pyroelectric sensor 610 is responsive to thermal changes of the slider 126 caused by contact with asperities on the disc 134. The piezoelectric sensor 612 and the pyroelectric sensor 610 are made from the same material. The material having both piezoelectric properties and pyroelectric properties. In one embodiment, the piezoelectric sensor and the pyroelectric sensor include lead titanate zirconate. The piezoelectric sensor 612 and the pyroelectric sensor 610 are formed by the same process. The piezoelectric sensor 612 includes a strip of thick film material placed across the trailing edge 410 of the slider. The piezoelectric sensor 612 includes lead titanate zirconate. The piezoelectric sensor 612 also may be a composite of epoxy and lead titanate zirconate. The pyroelectric sensor 610 also includes a strip of thick film material placed across the trailing edge 410 of the slider 126. The pyroelectric sensor includes lead titanate zirconate and may include epoxy to form a composite of epoxy and lead titanate zirconate. In one embodiment, both the piezoelectric sensor 612 and the pyroelectric sensor 610 include a conductive layer with a thick film layer placed atop the conductive layer, said thick film layer including a material having both pyroelectric and piezoelectric properties. The piezoelectric sensor 612 is a first strip and the pyroelectric sensor 610 is a second strip. Both the first and second strip traverse the trailing edge 410 of the slider 126.

A method of constructing a device 600 for testing smoothness of a rotatable disc includes forming a slider having an air-bearing surface, a leading edge and a trailing edge, and forming a first conductive strip in a first layer on the trailing edge of the slider. In addition, a second layer is formed including a material having piezoelectric and pyroelectric properties on the first layer. A second conductive strip may be formed near the first conductive strip in the first layer on the trailing edge of the slider. In addition, a second layer including a material having piezoelectric and pyroelectric properties is placed on the second conductive strip in the first layer. The first layer, including the first conductive strip and the second conductive strip, may be formed substantially simultaneously. The second layer may also be formed substantially simultaneously. The second layer may be formed using screen printing.

A device for testing smoothness of a rotatable disc includes a slider. The slider includes a leading edge, and a trailing edge. The slider also includes a device for detecting acoustic emissions and for detecting temperature changes. The device is associated with the trailing edge of the slider.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A device for testing smoothness of a rotatable disc, the device being operable to glide over a surface of the disc, said device comprising;

a slider further comprising:
   a leading edge; and
   a trailing edge;
a piezoelectric sensor carried by the trailing edge of the slider, the piezoelectric sensor being responsive to vibrations of the slider caused by contact with asperities on the disc; and
a pyroelectric sensor carried by the trailing edge of the slider, the pyroelectric sensor being responsive to thermal changes of the slider caused by contact with asperities on the disc.

2. The device for testing smoothness of a rotatable disc of claim 1 wherein the piezoelectric sensor and the pyroelectric sensor are made from the same material.

3. The device for testing smoothness of a rotatable disc of claim 2 wherein the piezoelectric sensor and the pyroelectric sensor include lead titanate zirconate.

4. The device for testing smoothness of a rotatable disc of claim 2 wherein the piezoelectric sensor and the pyroelectric sensor include a material having both piezoelectric properties and pyroelectric properties.

5. The device for testing smoothness of a rotatable disc of claim 1 wherein the piezoelectric sensor and the pyroelectric sensor are formed by the same process.

6. The device for testing smoothness of a rotatable disc of claim 1 wherein the piezoelectric sensor includes a strip of thick film material placed across the trailing edge of the slider.

7. The device for testing smoothness of a rotatable disc of claim 6 wherein the piezoelectric sensor includes lead titanate zirconate.

8. The device for testing smoothness of a rotatable disc of claim 6 wherein the piezoelectric sensor includes a composite of epoxy and lead titanate zirconate.

9. The device for testing smoothness of a rotatable disc of claim 1 wherein the pyroelectric sensor includes a strip of thick film material placed across the trailing edge of the slider.

10. The device for testing smoothness of a rotatable disc of claim 8 wherein the pyroelectric sensor includes lead titanate zirconate.

11. The device for testing smoothness of a rotatable disc of claim 8 wherein the pyroelectric sensor includes a composite of epoxy and lead titanate zirconate.

12. The device for testing smoothness of a rotatable disc of claim 1 wherein the piezoelectric sensor and the pyroelectric sensor comprise:
   a conductive layer; and
   a thick film layer place atop the conductive layer, said thick film layer including a material having both pyroelectric and piezoelectric properties.

13. The device for testing smoothness of a rotatable disc of claim 12 wherein the piezoelectric sensor is a first strip and the pyroelectric sensor is a second strip, both said first and second strip traversing the trailing edge of the slider.

14. The device for testing smoothness of a rotatable disc of claim 13 wherein the piezoelectric sensor and the pyroelectric sensor each include epoxy.

15. A method of constructing a device for testing smoothness of a rotatable disc, the method comprising:

forming a slider having an air-bearing surface, a leading edge and a trailing edge;

forming a first conductive strip in a first layer on the trailing edge of the slider; and forming a second layer including a material having piezoelectric and pyroelectric properties on the first layer.

16. The method of claim 15 further comprising:

forming a second conductive strip near the first conductive strip in the first layer on the trailing edge of the slider; and forming a second layer including a material having piezoelectric and pyroelectric properties on the second conductive strip in the first layer.

17. The method of claim 16 wherein the first layer including the first conductive strip and the second conductive strip is formed substantially simultaneously.

18. The method of claim 17 wherein the second layer including a material having piezoelectric and pyroelectric properties on the first layer is formed substantially simultaneously on the first conductive strip and on the second conductive strip.

19. The method of claim 16 wherein the second layer is formed using screen printing.

20. A device for testing smoothness of a rotatable disc, the device being operable to glide over a surface of the disc, said device comprising;

a slider further comprising:

a leading edge; and a trailing edge; and means for detecting acoustic emissions and for detecting temperature changes carried on the trailing edge of the slider.

* * * * *